(12) United States Patent
Zhang et al.

(10) Patent No.: US 7,302,099 B2
(45) Date of Patent: Nov. 27, 2007

(54) STROKE SEGMENTATION FOR TEMPLATE-BASED CURSIVE HANDWRITING RECOGNITION

(75) Inventors: Qi Zhang, Redmond, WA (US); Henry A. Rowley, New Castle, WA (US); Ahmad A. Abdulkader, Sammamish, WA (US); Angshuman Guha, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 10/704,785

(22) Filed: Nov. 10, 2003

(65) Prior Publication Data

US 2005/0100214 A1    May 12, 2005

(51) Int. Cl.
*G06K 9/18* (2006.01)
*G06K 9/00* (2006.01)

(52) U.S. Cl. ................. 382/186; 382/185; 382/187

(58) Field of Classification Search ......... 382/185–189
See application file for complete search history.

(56) References Cited

U.S. PATENT DOCUMENTS

| | | | |
|---|---|---|---|
| 5,729,629 A | | 3/1998 | Dai |
| 5,933,526 A | * | 8/1999 | Sklarew ............. 382/189 |
| 5,991,441 A | * | 11/1999 | Jourjine ............. 382/187 |
| 6,094,506 A | | 7/2000 | Hullender |
| 6,393,395 B1 | | 5/2002 | Guha et al. |
| 2002/0097910 A1 | | 7/2002 | Guha |
| 2004/0136591 A1 | * | 7/2004 | Morwing et al. ...... 382/186 |
| 2005/0100217 A1 | * | 5/2005 | Abdulkader et al. ... 382/186 |

OTHER PUBLICATIONS

Chang, Fu et al., Abstract: "Stroke Segmentation as a Basis for Structural Matching of Chinese Characters", Institute of Information Science, Rep. of China, Jul. 1993.
Chu, J.T., "Optimal Decision Functions for Computer Character Recognition", Journal of the Association for Computing Machinery, vol. 12, No. 2 (Apr. 1965), pp. 213-226, Philadelphia, PA.
Liu, Ke et al., "Robust Stroke Segmentation Method for Handwritten Chinese Character Recognition", Concordia University, Qauebec, Canada, Apr. 1997.
Methasate, Ithipan et al., "On-line Thai Handwriting Character Recognition Using Stroke Segmentation with HMM", National Science and Technology Development Agency, Bangkok, Thailand, Innsbruck, Austria, Feb. 18-21, 2002.

(Continued)

*Primary Examiner*—Vikkram Bali
(74) *Attorney, Agent, or Firm*—Banner & Witcoff, Ltd.

(57) ABSTRACT

Ink strokes of cursive writing are segmented to make the cursive writing more like print writing, particularly with respect to the number of strokes of a character. A stroke-segmentation module first finds the local extrema points on a stroke of input ink. Then the local extrema points are stepped through, two (or three) at a time. The stroke-segmentation module may compare the three (or four) ink segments that are adjacent to the two (or three) local extrema points to a set of predefined stroke-segmentation patterns to find a closest matching pattern. Strokes are then segmented based on a stroke-segmentation rule that corresponds to the closest matching pattern. Additional stroke segmentation may be performed based on the change of curvature of the segmented ink strokes. Then, a character-recognition module performs character recognition processing by comparing the segmented ink strokes to prototype samples at least some of which have been similarly segmented.

25 Claims, 10 Drawing Sheets

OTHER PUBLICATIONS

Meyer, Andre, "Pen Computing A Technology Overview and a Vision", SIGCHI Bulletin, vol. 27, No. 3, Jul. 1995.

Nishida, Hirobumi, "Model-Based Shape Matching with Structural Feature Grouping", IEEE Transactions on Pattern Analysis and Machine Intelligence, vol. 17, No. 3, Mar. 1995.

Srihari, Sargur N., "Document Image Understanding", State University of New York at Buffalo, Buffalo, NY, Jul. 1986.

Tappert, C.C., "Cursive Scriopt Recognition by Elastic Matching", IBM J. Res. Develop., vol. 26, No. 6, Yorktown Heights, New York, Nov. 1982.

Ueda, Naonori et al., "Learning Visual Models from Shape Contours Using Multiscale Convex/Concave Structure Matching", IEEE Transactions on Pattern Analysis and Machine Intelligence, vol. 15, No. 4, Apr. 1993.

* cited by examiner

STROKE SEGMENTATION FOR TEMPLATE-BASED CURSIVE HANDWRITING RECOGNITION

TECHNICAL FIELD

Embodiments of the invention relate to automatic recognition of handwritten cursive characters. In particular, embodiments of the invention relate to segmenting handwritten cursive characters to make the cursive characters appear more like print characters before performing character-recognition processing.

BACKGROUND OF THE INVENTION

Computers accept human user input in various ways. One of the most common input devices is the keyboard. Additional types of input mechanisms include mice and other pointing devices. Although useful for many purposes, keyboards and mice (as well as other pointing devices) sometimes lack flexibility. For example, many persons find it easier to write, take notes, etc. with a pen and paper instead of a keyboard. Mice and other types of pointing devices do not generally provide a true substitute for pen and paper. Traditional input device limitations are even more acute with regard to East Asian languages. As used herein, "East Asian" includes, but is not limited to, written languages such Japanese, Chinese and Korean. Written forms of these languages contain thousands of characters, and specialized keyboards for these languages can be cumbersome and require specialized training to properly use.

Electronic tablets or other types of electronic writing devices offer an attractive alternative to keyboards and mice. These devices typically include a stylus with which a user can write upon a display screen in a manner similar to using a pen and paper. A digitizer nested within the display converts movement of the stylus across the display into an "electronic ink" representation of the user's writing. The electronic ink is stored as coordinate values for a collection of points along the line(s) drawn by the user. Software may then be used to analyze the electronic ink to recognize characters, and then convert the electronic ink to Unicode, ASCII or other code values for what the user has written.

There are many handwriting recognition systems in use employing various algorithms to map handwritten data to characters. One such system is described in commonly-owned U.S. Pat. No. 5,729,629 ('629 patent), titled "Handwritten Symbol Recognizer," which patent is incorporated by reference herein. The described recognizer is useful for, e.g., recognition of East Asian language characters. The recognizer implements template matching for characters written in multiple strokes, to map an input character to a Unicode or other value for the ink character. Each input stroke of a character is described by a five-dimensional feature vector representing the x and y coordinates of the stroke start and end points, together with a feature code corresponding to the overall shape of the stroke (e.g., vertical line, horizontal line, counterclockwise arc, etc.). The recognizer measures a Euclidian Vector Distance between each input stroke and a stroke of a stored reference character (or "prototype"). The database of prototypes is divided into multiple groupings (or "spaces") based on the number of features in the prototype. For example, a 5-space contains prototypes having five features.

Another recognizer, which is similar in many respects to the recognizer described in the '629 patent, is described in commonly-owned U.S. Pat. No. 6,094,506 ('506 patent), titled "Automatic Generation of Probability Tables for Handwriting Recognition Systems," which patent is also incorporated by reference herein. In that recognizer, each stoke of an input character is also described by a five-dimensional vector representing a feature code for the stroke and the x and y coordinates of stroke start and end points. The input character is then compared against every prototype in a database having the same number of strokes as the input character. To perform this comparison, a Shape Feature Probability Matrix (SFPM) is created in which each possible shape feature corresponds to a row and to a column. Each entry in the SFPM represents a probability that, for any two characters having s strokes and having shape features $f_i$ and $f_j$ at position p (where $f_i$ is the feature code for the input stroke, $f_j$ is the feature code for the prototype stroke and p=1, 2, . . . s), the characters are the same. A Position Feature Probability Table (PFPT) is also generated. The PFPT is a one-dimensional array containing one entry for each possible feature distance, and which is indexed by feature distance. The feature distance is calculated as $(x^i_{p1}-x^i_{p1})^2 + (x^j_{p2}-x^i_{p2})^2 + (y^j_{p1}-y^i_{p1})^2 + (y^j_{p2}-y^i_{p2})^2$, where $(x^i_{p1}, y^i_{p2})$ are the starting and end points for stroke p of the input ink. Each entry in the PFPT represents a probability that, for any two characters having s strokes and a feature distance D between strokes at the same position p, the characters are the same. During recognition, each input character is compared to each prototype by comparing the strokes of the input character to respective strokes of the prototype (i.e., the first stroke of the input character is compared against the first stroke of the prototype, then the second stroke of the input character is compared against the second stroke of the prototype, and so on). Using the SFPM, a first number is computed by summing values obtained by indexing the first input and prototype strokes, by indexing the second input and prototype strokes, etc. Using the PFPT, a second number is computed by summing values indexed by the feature distances between the first input and prototype strokes, between the second input and prototype strokes, etc. A Match Probability value equals the sum of these first and second numbers. The prototype for which a comparison against the input character results in the highest probability of a match is considered the best match. As described in the '506 patent, the SFPM and PFPT values are based on a negative logarithmic function of the probability. Thus, the lowest Match Probability value corresponds to the highest probability of match.

The recognizers described by the '629 and '506 patents work by matching an input ink character having s strokes only against prototypes having the same number of strokes, i.e., in the s space. For characters written in print form, this presents few problems. As used herein, "print" refers to a writing style in which a user attempts to create a character so as to mimic a standardized format, and is distinguished from machine-printed characters (e.g., typed, computer generated font, etc.). Although there are variations in the relative position and shape of strokes for a given handwritten printed character, different users generally print the character using the same number of strokes.

Challenges arise in connection with recognizing cursive handwriting. Often, a cursive representation of a particular character will connect two or more strokes into a single stroke. Strokes may also be skipped and/or rounded in cursive handwriting. In theory, a character written in s strokes in print form can be written in 1 to s strokes in cursive form. This is illustrated in FIG. 1, which shows the Simplified Chinese character having Unicode code point U+9752 (phonetically "qing," meaning "green"). The character is shown in standard form on the left side of the figure, and in progressively more cursive variations toward the right side of the figure.

East Asian languages generally contain many characters that, when written in print, contain a large number of strokes. In cursive writing, these strokes are often joined together. But there are many different patterns in which strokes may be joined. To accurately recognize these various patterns, a large number of training samples would need to be collected. The number of stroke-connection patterns, however, is prohibitively large, such that data collection would be too expensive and training a recognizer would be too time consuming. Accordingly, techniques for segmenting cursive handwriting to more closely resemble print handwriting so that a handwriting recognizer, which has been trained mainly on print data, can process the segmented cursive writing would be desirable.

SUMMARY OF THE INVENTION

Template matching is a character-recognition technique in which strokes of input ink are compared to corresponding strokes of individual prototypes of a set of stored prototypes. With cursive writing, strokes may be joined together in various ways, making this comparison difficult. Embodiments of the invention relate to segmenting the strokes of cursive writing to make cursive writing more like print writing, particularly with respect to the number of strokes of a particular character. Since print prototypes are more readily available and have fewer varieties in writing, this approach increases the probability of matching a cursive character using a recognizer having mostly print prototypes. This improves East Asian cursive handwriting recognition accuracy and significantly reduces the amount of data that needs to be collected for training the character recognizer.

According to at least one embodiment of the invention, a user creates an electronic ink representation of a character. The ink strokes are then segmented by a stroke segmentation module, which essentially divides selected strokes of ink that have been written into smaller pieces so that the segmented ink sample will more closely resemble a print version of the character.

In at least one embodiment of the invention, the stroke segmentation module first finds the local extrema points on a stroke of input ink. Then the local extrema points are stepped through, two (or three) at a time. The stroke segmentation module compares the three (or four) ink segments that are adjacent to the two (or three) local extrema points to a set of predefined stroke-segmentation patterns to find a closest matching stroke-segmentation pattern. Strokes are then segmented based on a stroke-segmentation rule that corresponds to the closest matching stroke-segmentation pattern.

Then, according to at least one embodiment, a character recognition module performs character recognition processing by comparing the segmented ink strokes to prototype samples at least some of which have been similarly segmented.

Additional features and advantages of the invention will be apparent upon reviewing the following detailed description.

DETAILED DESCRIPTION OF THE INVENTION

I. Terms

Unless otherwise specified, the following terms have the following meanings throughout this specification and the claims.

"Ink" or "electronic ink" refers to a sequence or a set of strokes with properties. The sequence of strokes may include strokes ordered, for example, by the time captured. Each stroke is comprised of a sequence of points, which may be represented using a variety of known techniques including Cartesian coordinates (X, Y), polar coordinates (r, Θ), and other techniques.

A "stroke" refers to a sequence or set of captured points. For example, when rendered, the sequence of points may be connected with lines. Alternatively, the stroke may be represented as a point and a sequence of vectors in the direction of the next point. A stroke is intended to encompass any representation of points or segments relating to ink, irrespective of the underlying representation of points and/or what connects the points.

A "character" is generally a known letter or symbol. Characters can also be code points (e.g., UNICODE or ASCII elements) or can be letters or symbols for a particular language. Characters may also generally be shapes, for example, squares, triangles or circles.

II. General Purpose Computing Environment

Figure 2:
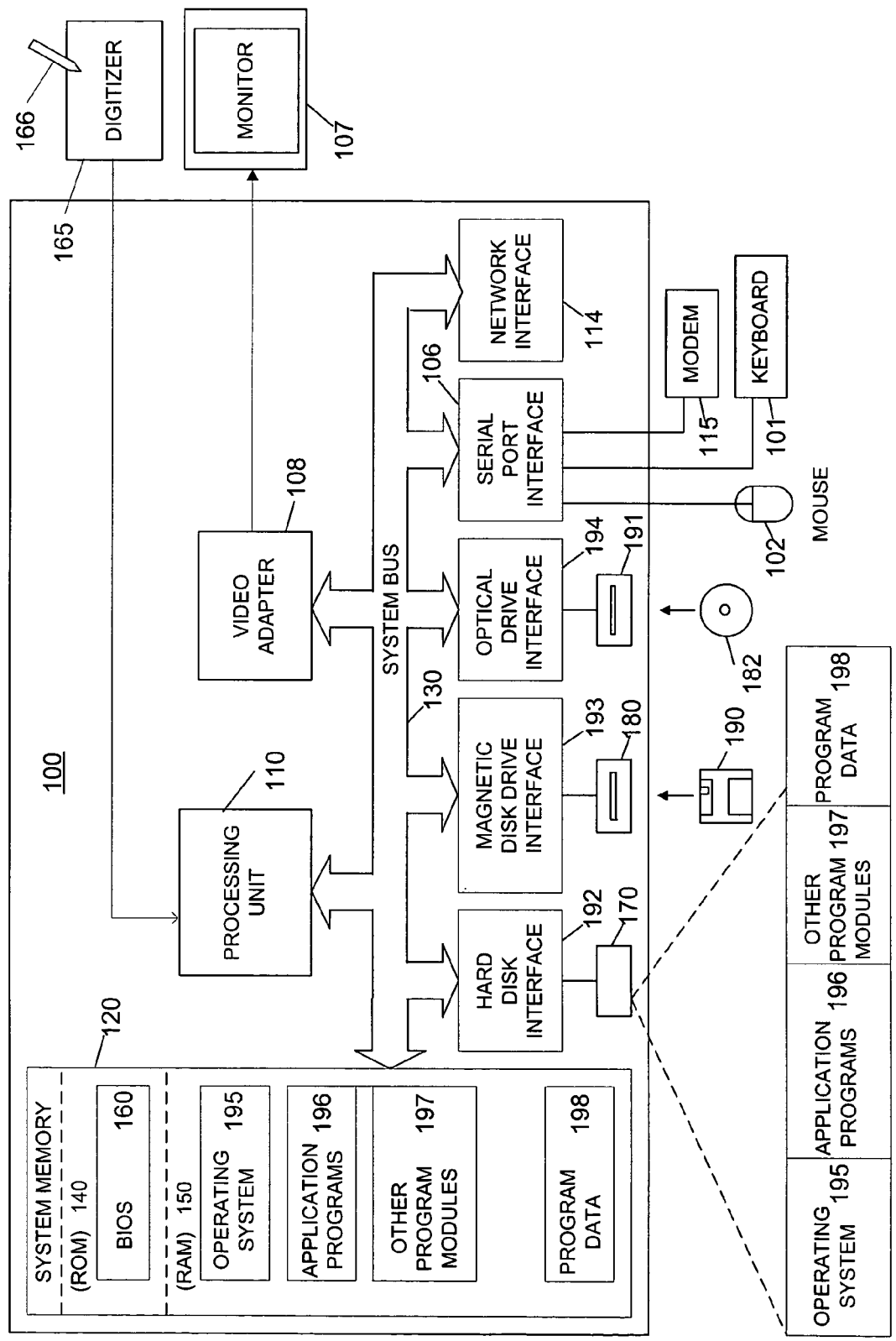
FIG. 2 is a block diagram of a general-purpose digital computing environment that can be used to implement various aspects of the invention.

FIG. 2 illustrates a schematic diagram of an exemplary conventional general-purpose digital computing environment that can be used to implement various aspects of the invention. The invention may also be implemented in other versions of computer 100, for example without limitation, a hand-held computing device or a tablet-and-stylus computer. The invention may also be implemented in connection with a multiprocessor system, a microprocessor-based or programmable consumer electronic device, a network PC, a minicomputer, a mainframe computer, hand-held devices, and the like. Hand-held devices available today include Pocket-PC devices manufactured by Compaq, Hewlett-Packard, Casio, and others.

Computer 100 includes a processing unit 110, a system memory 120, and a system bus 130 that couples various system components including the system memory to the processing unit 110. The system bus 130 may be any of various types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), which is stored in the ROM 140, contains the basic routines that help to transfer information between elements within the computer 100, such as during start-up. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 182 such as a CD ROM, DVD or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for computer 100. Other types of computer readable media may also be used.

A number of program modules can be stored on the hard disk drive 170, magnetic disk 190, optical disk 182, ROM 140 or RAM 150, including an operating system 195, one or more application programs 196, other program modules 197, and program data 198. A user can enter commands and information into the computer 100 through input devices such as a keyboard 101 and/or a pointing device 102. These and other input devices are often connected to the processing unit 110 through a serial port interface 106 that is coupled to the system bus, but may be connected by other interfaces, such as a parallel port, game port, a universal serial bus (USB) or a BLUETOOTH interface. Further still, these devices may be coupled directly to the system bus 130 via an appropriate interface (not shown). A monitor 107 or other type of display device is also connected to the system bus 130 via an interface, such as a video adapter 108.

In one embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

Figure 3:
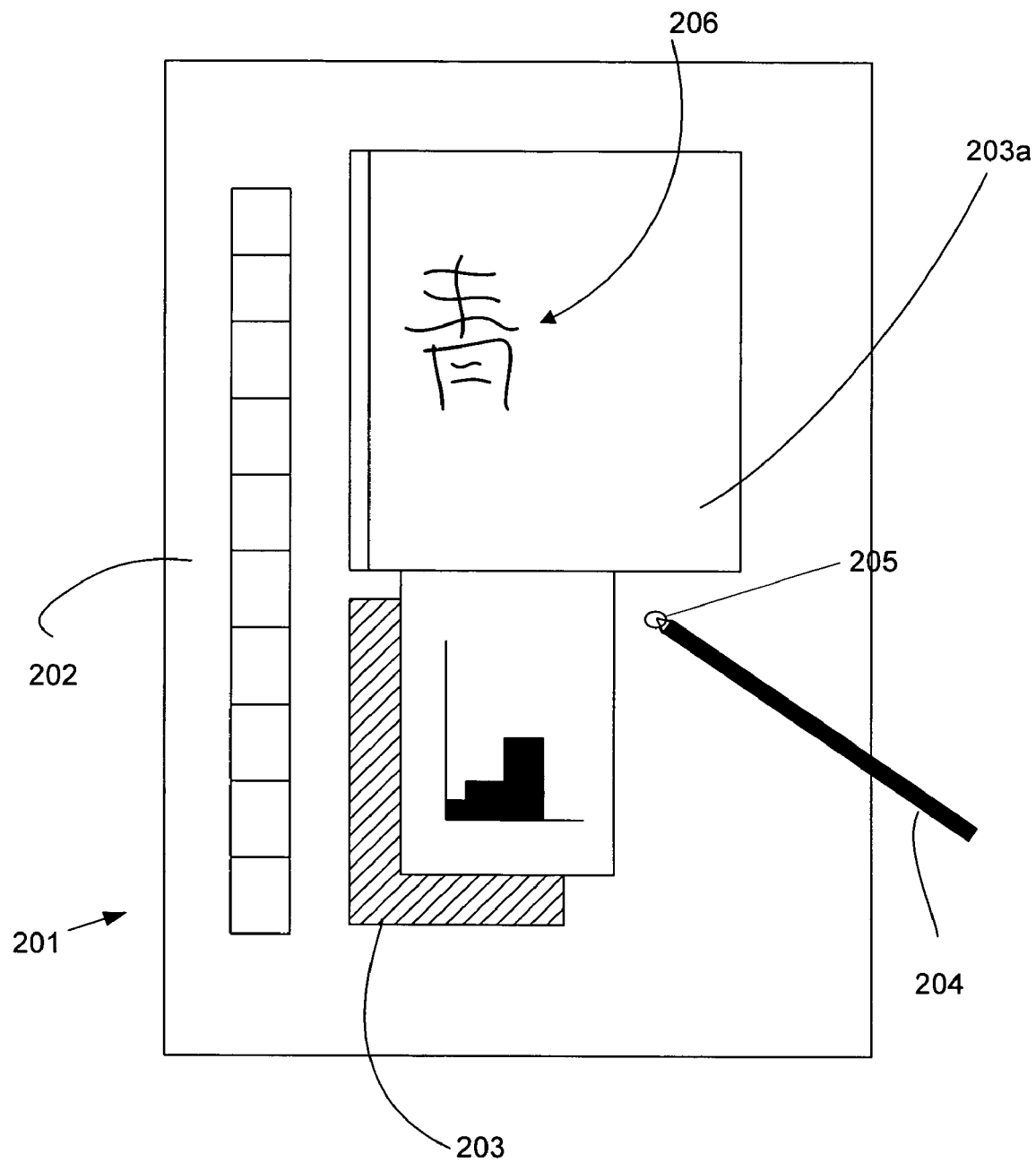
FIG. 3 is a block diagram of an exemplary hand-held device or tablet-and-stylus computer that can be used in accordance with various aspects of the invention.

FIG. 3 illustrates an example of a hand-held device or tablet-and-stylus computer 201 that can be used in accordance with various aspects of the invention. Any or all of the features, subsystems, and functions in the system of FIG. 2 can be included in the computer of FIG. 3. Hand-held device or tablet-and-stylus computer 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Hand-held device or tablet-and-stylus computer 201 interprets gestures made using stylus 204 in order to manipulate data, enter text, create drawings, and/or execute conventional computer application tasks such as spreadsheets, word processing programs, and the like. For example, a window 203a allows a user to create electronic ink 206 using stylus 204.

The stylus 204 may be equipped with one or more buttons or other features to augment its selection capabilities. In one embodiment, the stylus 204 could be implemented as a "pencil" or "pen," in which one end constitutes a writing portion and the other end constitutes an "eraser" end, and which, when moved across the display, indicates portions of the display are to be erased. Other types of input devices, such as a mouse, trackball, or the like could be used. Additionally, a user's finger could be the stylus 204 and used for selecting or indicating portions of the displayed image on a touch-sensitive or proximity-sensitive display. Region 205 shows a feedback region or contact region permitting the user to determine where the stylus 204 has contacted the display surface 202.

III. Stroke Segmentation for Template-Based Cursive Handwriting Recognition

Template matching is a character recognition technique in which strokes of input ink are compared to corresponding strokes of individual prototypes of a set of stored prototypes. With cursive writing, strokes may be joined together in various ways, making this comparison difficult. Embodiments of the invention relate to segmenting strokes of cursive writing to make cursive writing more like print writing, particularly with respect to the number of strokes of a particular character. Since print prototypes are more readily available and have fewer varieties in writing, this approach increases the probability of matching a cursive character using a recognizer that uses mostly print prototypes. This improves East Asian cursive handwriting recognition accuracy and reduces the amount of data that needs to be collected.

Although the invention is described in the context of East Asian character recognition, the invention is not limited thereby. Embodiments of the invention may also be used for recognition of Latin, Greek and Cyrillic alphabets, for recognition of Hindi, Arabic and other written languages, and for other types of character or image recognition.

Figure 4:
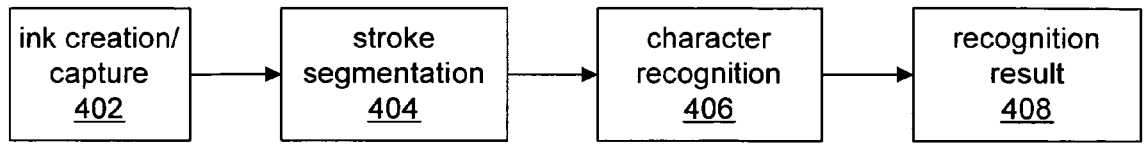
FIG. 4 is a block diagram showing operation of at least one embodiment of the invention.

FIG. 4 is a block diagram showing operation of at least one embodiment of the invention. At block 402, a user creates an electronic ink representation of a character. In one embodiment, the user creates this ink by moving a writing device across a tablet, and a computer generates data for a series of points on a display over which the writing device is moved. The ink strokes are then segmented by stroke segmentation module 404, which essentially divides the strokes of ink that have been written into smaller pieces so as to more closely resemble a print version of the character. Then character recognition module 406 performs character-recognition processing by comparing the segmented ink strokes to prototype samples that have been similarly segmented. In accordance with at least one embodiment of the invention, when creating a database of prototypes against which matching will be done, the sample characters, which may become prototypes, are segmented in substantially the same way that input characters to be recognized will be segmented by stroke segmentation 404. This is done because, although the majority of the sample data might be print, there may be some cursive samples that should be segmented in substantially the same way that characters to be recognized will be segmented in the running system. Stated differently, stroke segmentation is done substantially the same way at training time and at runtime. In at least one embodiment of the invention, character recognizer 406 operates as described in U.S. Pat. No. 5,729,629, previously incorporated by reference. In other embodiments, character recognizer 406 operates as described in U.S. Pat. No. 6,095,506, also previously incorporated by reference. After processing by character recognizer 406, a recognition output (e.g., a Unicode value) is provided at block 408.

An East Asian character is written as a sequence of one or more strokes. An East Asian handwriting recognizer in accordance with at least one embodiment of the invention uses a template-matching technique for characters written in four or more strokes. Each stroke is described by a five dimensional feature vector, representing the x and y coordinates of the start and end points of the stroke, and the overall shape of the stroke. Character recognition involves mapping the features for the set of strokes of a character back to the Unicode value of the character that the user wrote. The character recognizer typically works by taking the stroke features, and measuring their "distance" to the features of some training samples, which are known as prototypes. The database of prototypes is divided into multiple groupings or spaces, based on the number of the stroke features of the prototype. For handwritten print characters, the input ink is matched against only the prototypes with the same number of stroke features, i.e. in the same character-recognition space. This works fine for characters written in print form, since although there are variations in the relative position and shape of the stroke, the number of strokes is the same for samples of the same character. It is assumed that the prototypes of that character are in the same space as the input ink. However, for characters written in cursive form, consecutive strokes may be connected and written in a single stroke. Theoretically, a character written in n strokes in print form can be written in 1 to n strokes in cursive writing. The prototypes of the same character thus could be in multiple spaces. To cover many different writing styles, many more prototypes for the same character will be needed in the database, since each character can no longer be covered in a single space. However, this would involve a very large data collection effort, which is impractical. Even if samples could be gathered for substantially all possible variations of cursive styles, it would be impractical to use all of the prototypes, because it would require too much memory and it would result in an undesirable increase in the prototype-searching time during character-recognition processing.

Figure 1:
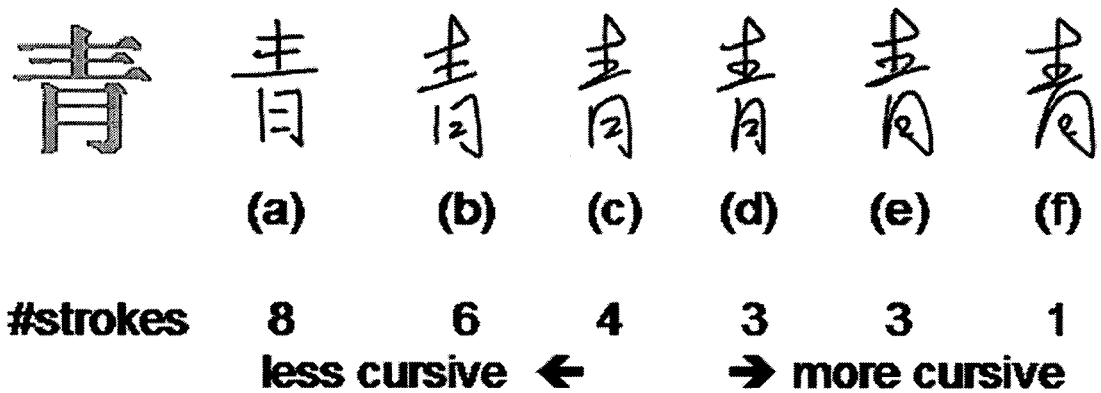
FIG. 1 shows samples of print and cursive writing styles, including a variety of stroke-connection patterns, for one character.

As mentioned previously, one of the differences between cursive and print East Asian handwriting is that consecutive strokes in the print form can be connected and written in one stroke in the corresponding cursive form, as is depicted in FIG. 1. Such a stroke in cursive writing can be viewed as composed of two different types of ink segments: stroke segments (ink segments corresponding to strokes that also appear in the print writing) and connecting segments (ink segments used in cursive writing to connect the stroke segments). Using these definitions, there may be one connecting segment between two stroke segments. In accordance with at least one embodiment of the invention, stroke segmentation module 404 identifies the connecting segments in strokes based on common East Asian cursive writing patterns. The connecting segments may then be removed from the ink sample to make the cursive writing more print-like.

In practice, however, there is often no clear boundary between connecting segments and stroke segments. The connecting segments in one pattern could be a real stroke segment in a similar pattern. In accordance with at least one embodiment of the invention, stroke segmentation module 404 identifies a list of potential connecting segments in a stroke and removes a potential connecting segment only if there is a relatively high level of confidence that the potential connecting segment is truly a connecting segment. The remaining potential connecting segments are broken (i.e., divided) at or near a connection point between the potential connecting segment and one of the adjoining stroke segments. In this way, the cursive writing is converted into a more print-like form, especially with respect to its number of strokes. The character recognition module 406 is then able to make better use of existing print prototypes and reduce the additional prototypes required to support improved cursive recognition.

Because of the usual "top to bottom, left to right" writing order in East Asian writing, the transition points from a stroke segment to a connecting segment are oftentimes the local extrema points along the stroke in x or y directions. In accordance with at least one embodiment of the invention, stroke segmentation module 404 first finds the local extrema points on a stroke of input ink. Then the local extrema points are stepped through, two (or three) at a time. The stroke segmentation module 404 compares the three (or four) ink segments that are adjacent to the two (or three) local extrema points to a set of predefined stroke-segmentation patterns to find a closest matching stroke-segmentation pattern. Strokes are then segmented based on a stroke-segmentation rule that corresponds to the closest matching stroke-segmentation pattern.

Figure 5:
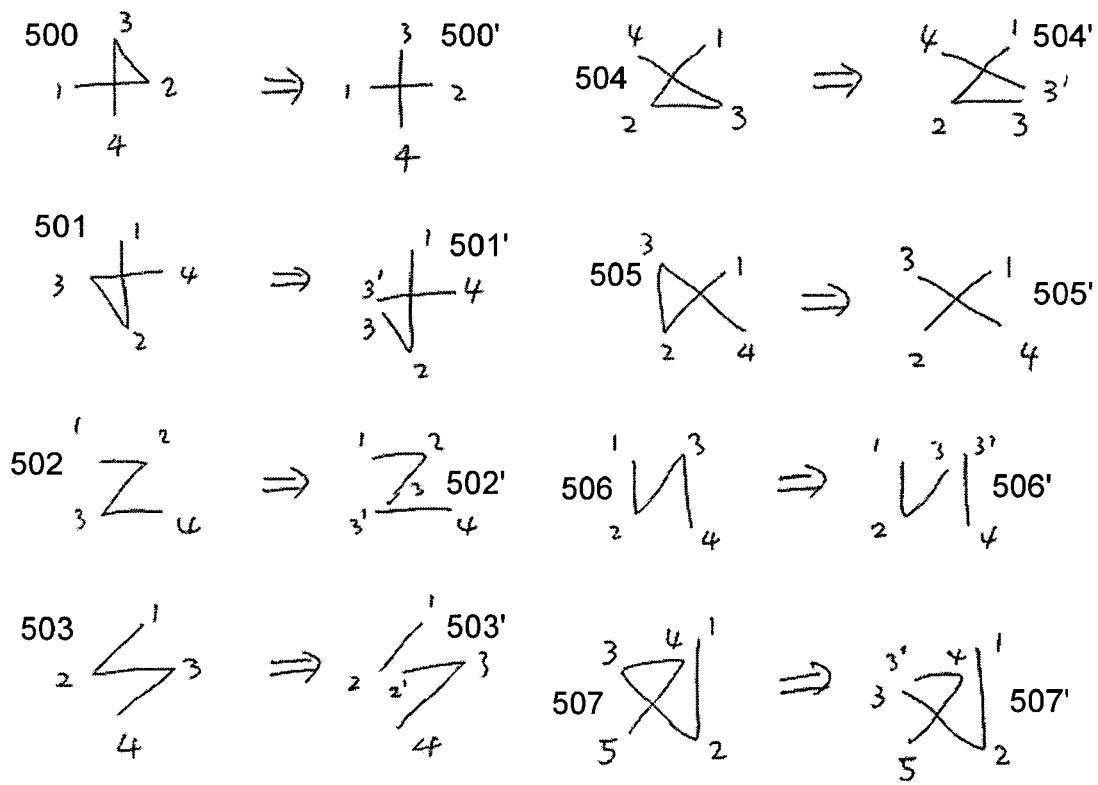
FIG. 5 depicts a set of stroke-segmentation rules in accordance with at least one embodiment of the invention.

In accordance with at least one embodiment of the stroke-segmentation module 404, computer-readable instructions corresponding to the following pseudo code apply a set of stroke-segmentation rules depicted in FIG. 5.

```
Given ink sample I;
Initialize new ink I';
For each stroke s_i in the ink sample I
{
    Smooth stroke s_i;
    Find extrema points p of s_i on x and y direction;
    If (p.count < 2     // less than two extrema points
    {
        Add s_i to I';
    }
    Else
    {
        // Go through points in p
        // p[-1] represent the start point of stroke s_i
        // p[p.count] represent the end point of stroke s_i
        For (k = 0; k < p.count-1; k++)
        {
            Match segments from p[k-1] through p[k+2] to patterns
            500-506;
            If (Match to pattern x found)
            {
                Segment p[k-1]-p[k-2] using rule related to pattern x;
                k++;
            } Else if (k+3 <= p.count) {
                Match segments from p[k-1] through p[k+3] to
                pattern 507;
                If (Match found)
                {
                    Segment p[k-1]-p[+3]using rule related to
                    pattern 507;
                    k++;
                }
            }
        }
        If (no matching rule found)
        {
            Add s_i to I';
        } Else {
```

```
// s_i is segmented to a set of strokes s_{i1}, ..., s_{in} based on
rules
Add new strokes s_{i1}, ..., s_{in} to I';
    }
  }
}
```

Figure 6:
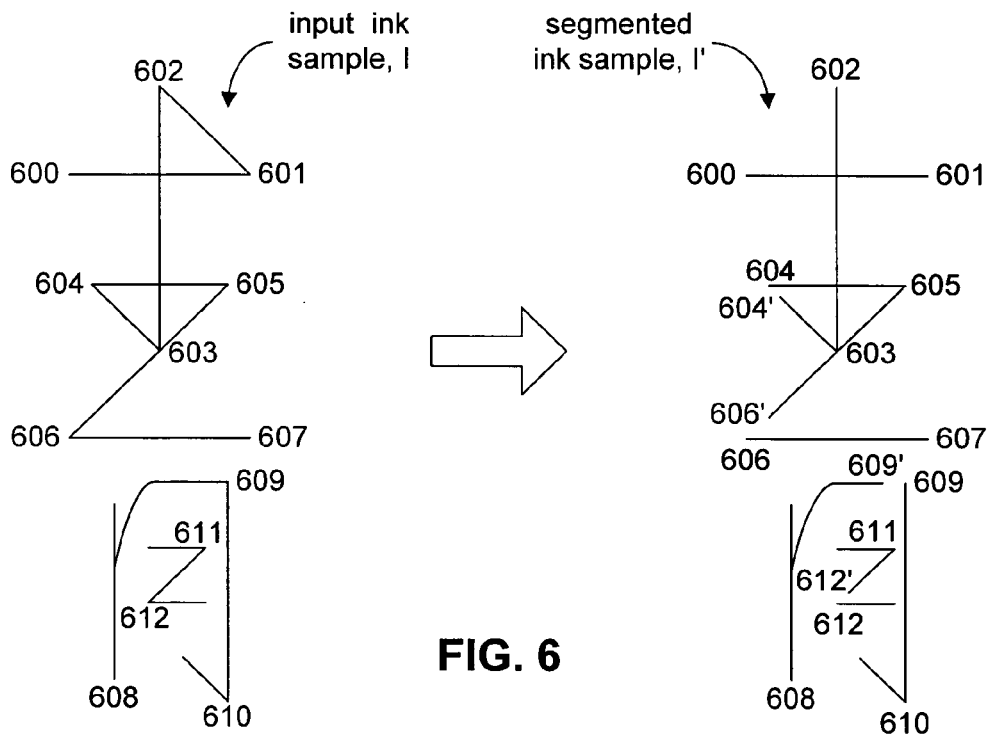
FIG. 6 depicts an input ink sample and a version of the input ink sample segmented in accordance with at least one embodiment of the invention.

Referring to the pseudo code above, given an input ink sample I, a new ink sample I', which will be a segmented version of input ink sample I, is initialized. For each stroke, $s_i$ in the ink sample I, the following stroke segmentation algorithm is performed. Stroke $s_i$ is smoothed, which is essentially filtering or averaging the sampled ink stroke. Local extrema points p are found by keeping track of the points along the smoothed ink strokes and detecting when a minimum or maximum occurs in either the x or y directions. In FIG. 6, the x direction is oriented horizontally, and the y direction is oriented vertically. The points along the ink strokes are walked with a step size r, where r equals 1/48 of the width or height of the bounding box of I, whichever is bigger. As points along the ink strokes are walked, local extrema points are found when the stroke changes direction along either the x or y axis by more than a threshold distance. The threshold distance is determined as 2.6 times the step size r. For example, in FIG. 6, points 600 through 607 represent a sequence of points along a first stroke, and points 601 through 606 represent the local extrema points of this stroke.

Figure 7:
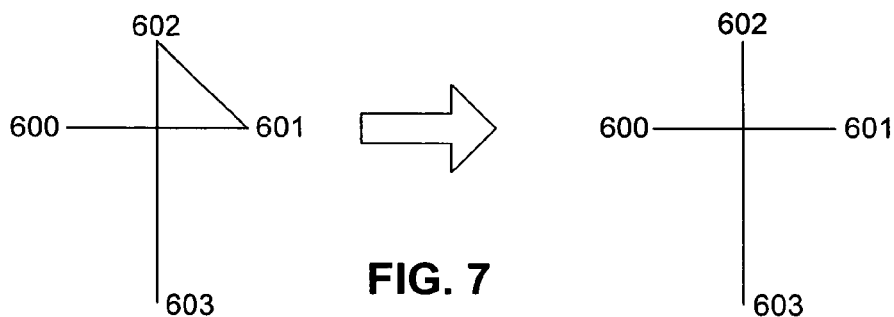
FIGS. 7-11 depict application of various stroke-segmentation rules from FIG. 5 to portions of the input ink sample of FIG. 6.

If a stroke has fewer than two extrema points, no segmentation is performed and it is added to the segmented ink sample I' directly. Otherwise, a set of rules is applied to the stroke for generating a segmented version of the stroke, which will be included in the segmented ink sample I'. For example, an exemplary input ink sample I, is shown on the left side of FIG. 6. By applying the set of segmentation rules shown in FIG. 5, the segmented ink sample I' (FIG. 6) is generated based on the input ink sample I shown in FIG. 6. In applying the rules shown in FIG. 5, the ink segments adjoining the local extrema points 601 and 602 are compared with the stroke-segmentation patterns 500-507. The patterns in the rules are represented using the writing direction of ink segments, the turning angle between ink segments, and the relative position of local extrema points to the ink segments. For example, pattern 500 is encoded as: first ink segment (1-2) is written from left to right, the turning angle from the first and the second segments (from 1-2 to 2-3) is counter clockwise, the turning angle from the second to the third segments (from 2-3 to 3-4) is counter clockwise, and the third (3) and fourth (4) local extrema points are on different sides of the first ink segment (1-2). The rule corresponding to the closest matching stroke-segmentation pattern is then applied to segment this portion of the first stroke. The matching process first encodes the input ink segments with a set of features that is substantially the same as those used to represent the patterns. For instance, referring to FIG. 7, for the first three segments, 600-601, 601-602, and 602-603, of the input ink sample I of FIG. 6, they are encoded as: first ink segment (600-601) is written from left to right, the turning angle from the first and the second segments (from 600-601 to 601-602) is counter clockwise, the turning angle from the second to the third segments (from 601-602 to 602-603) is counter clockwise, and the third (602) and fourth (603) local extrema points are on different sides of the first ink segment (600-601). The matching process then goes through the patterns to see which one has substantially the same encoding as the input ink segments. In this case, apparently, the matching pattern from patterns 500-507 is pattern 500. By applying the rule corresponding to pattern 500, connecting segment 601-602 is removed, as is shown on the right side of FIG. 7.

The rules shown in FIG. 5 are specific to East Asian cursive writing. Other rules could be used for different languages. The first rule, which corresponds to pattern 500, is based on knowledge that counterclockwise strokes are uncommon in East Asian writing. Strokes of East Asian writing typically proceed from the top downwardly, or from the left to the right. The rule corresponding to pattern 505 is derived from knowledge that it is a common way to write pattern 505' cursively and there are no patterns that are similar to 505 in print writing. Patterns 500 and 505 are very unlikely to appear in print writing, so there is a relatively high level of confidence that the ink segment between points 2 and 3 in these two patterns is a connecting segment. These two rules remove the connecting segment between points 2 and 3 in these patterns to make the resulting ink print-like. However, for the other patterns, similar patterns may also present in print writing, so the corresponding rules break the stroke at a local extrema point without removing an ink segment. These rules help transform cursive writing to a more print-like form with respect to its number of strokes. Patterns 500 to 506 contain 3 ink segments. Pattern 507 contains 4 ink segments. The difference between pattern 501 and the first 3 segments of pattern 507 is that points 3 and 4 are on different sides of segment 1-2 in 501, but they are on the same side in 507. The input ink is mapped to patterns 500 to 506 first, if a match is found, pattern 507 is not considered. If no matching is found and there is a fourth segment present in the input ink, matching to pattern 507 is considered.

Figure 8:
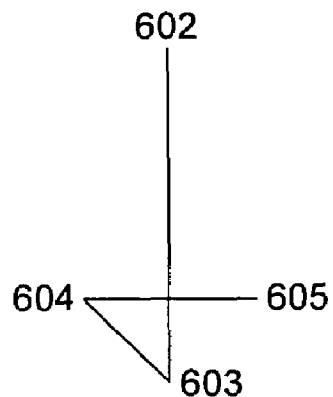
Figure 8:
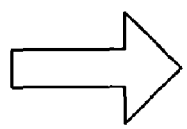
Figure 8:
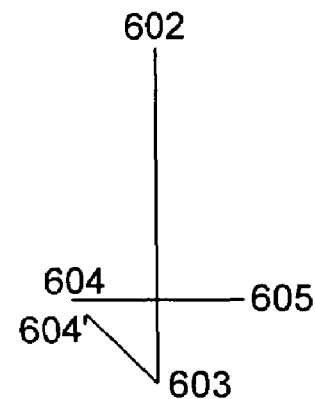

The segmentation processing of stroke 600-607 then continues from point 602 and includes the segments adjacent to local extrema points 603 and 604, namely segments 602-603, 603-604, and 604-605. Pattern 501 is the closest matching pattern for the three segments 602-605. Accordingly, as shown in FIG. 8, the rule corresponding to pattern 501 is applied to segments 602-605. This results in the connecting segment 603-604 being broken (i.e., cut short as depicted by broken connecting segment 603-604') at or near local extrema point 604.

Figure 9:
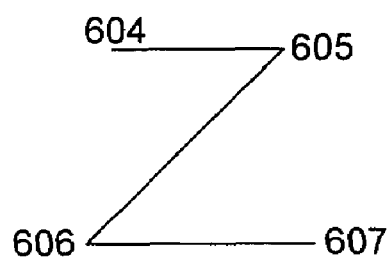
Figure 9:
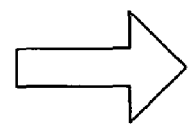
Figure 9:
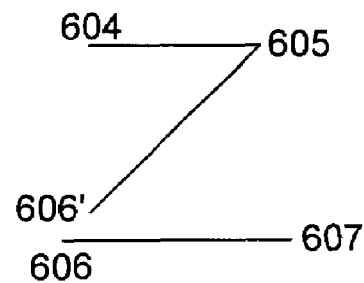

Referring to FIG. 9, processing of stroke 600-607 then continues from point 604 and includes the segments adjacent to local extrema points 605 and 606. Pattern 502 is the closest matching pattern for the three segments 602-605. Accordingly, the rule corresponding to pattern 502 is applied to segments 604-607. This results in the connecting segment 605-606 being broken (i.e., cut short as depicted by broken connecting segment 605-606') at or near local extrema point 606.

Because each of the pairs of local extrema points of stroke 600-607 have been processed, segmentation processing of the first stroke, which includes points 600-607, is complete with the first stroke of the ink sample I being segmented into four segments in the segmented ink sample I'. This is the same number of strokes that appears in the top half of the print character on the left side of FIG. 1. So, although the shape of some of these segmented strokes differs from the shape of the strokes in the top portion of the print character in FIG. 1, the number of strokes has been made the same, thereby facilitating the use of print-character prototype samples during character recognition.

Figure 10:
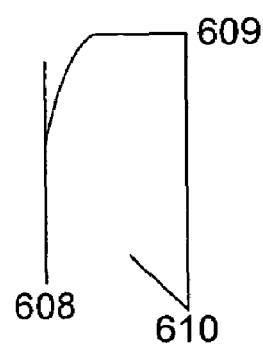
Figure 10:
Figure 10:
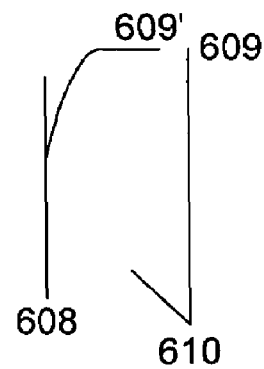

Processing of the ink sample I of FIG. 6 continues with the second stroke of ink Sample I. The second stroke has local extrema points 608-610. Referring to FIG. 10, processing of the second stroke begins with processing of the segments adjacent to local extrema points 608 and 609. Pattern 506 is the closest matching pattern for the three segments that are adjacent to local extrema points 608 and 609. Accordingly, the rule corresponding to pattern 506 is applied and results in the connecting segment 608-609 being broken (i.e., cut short as depicted by broken connecting segment 608-609') at or near local extrema point 609.

Because the pairs of local extrema points of the second stroke, which includes local extrema points 608-610, have been processed, segmentation processing of the second stroke is complete and processing of the ink sample I of FIG. 6 continues with the third stroke of ink Sample I.

Figure 11:
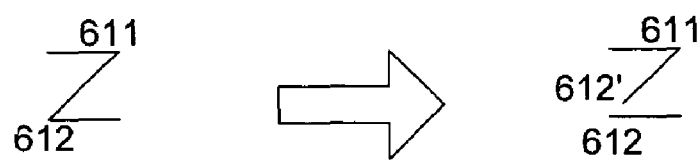

Referring to FIG. 11, processing of the third stroke involves processing the segments adjacent to local extrema points 611 and 612. Pattern 502 is the closest matching pattern for the three segments that are adjacent to local extrema points 611 and 612. Accordingly, the rule corresponding to pattern 502 is applied and results in the segment 611-612 being broken at or near local extrema point 612.

In accordance with at least one embodiment of the invention, segmentation processing of ink sample I is then completed. And, referring back to FIG. 6, application of the rules from FIG. 5, as discussed above, results in a segmented ink sample I', as shown in FIG. 6. The segmented ink sample I' includes 8 strokes: (1) stroke 600-601; (2) stroke 602-604'; (3) stroke 604-606'; (4) stroke 606-607; (5) the stroke with points 608 and 609'; (6) the stroke with points 609 and 610; (7) the stroke with points 611 and 612'; and (8) the stroke that starts at point 612. Although the shape of some of the strokes is different relative to the print character of FIG. 1, the number of strokes is the same.

Figure 12:
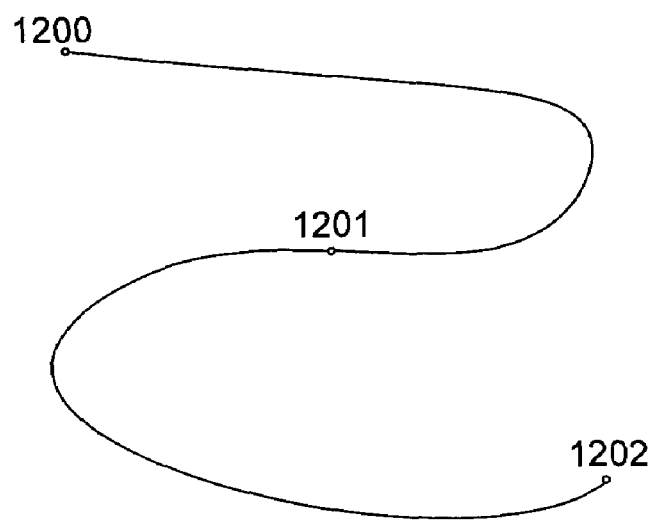
FIGS. 12 and 13 depict sample ink strokes for purposes of explaining additional stroke-segmentation rules that may be applied to a segmented ink stroke in accordance with at least one embodiment of the invention.

In accordance with at least one embodiment of the invention, additional segmentation processing may be performed on the segmented ink sample I'. For instance, when the curvature of an ink stroke changes (e.g., from clockwise to counterclockwise and/or from counterclockwise to clockwise), the stroke may be segmented. For example, referring to FIG. 12, between points 1200 and 1201, the ink stroke curves in a clockwise direction. From point 1201 to point 1202, the ink curves in a counterclockwise direction. Therefore, this ink stroke may be segmented at or near point 1201 due to the change in curvature of the ink stroke at point 1201.

Figure 13:
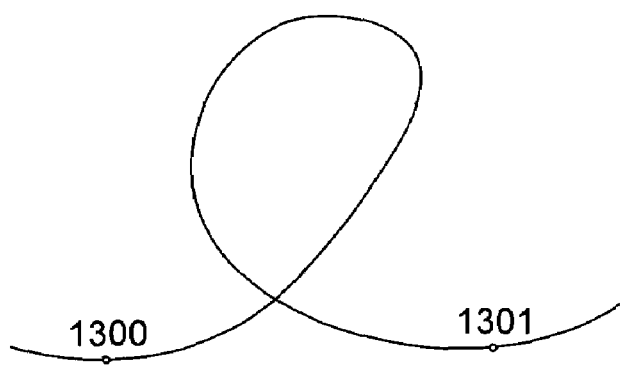

In addition, or alternatively, when the cumulative curvature change of a stroke exceeds approximately 360 degrees, then the stroke may be segmented. For example, referring to FIG. 13, as the ink stroke progresses from point 1300 to point 1301, the cumulative curvature change of the ink stroke is approximately 360 degrees. Therefore, the ink stroke could be segmented at or near point 1301 due to the stroke's cumulative curvature change being greater than approximately 360 degrees.

IV. Character Recognition

In at least one embodiment, character recognition module 406 operates as described in U.S. Pat. No. 6,094,506, previously incorporated by reference. As described in said patent, the input ink, which, here, is the output of stroke segmentation module 404, is first converted to chains of reference vectors.

The input character is then compared against every prototype in a database having the same number of stroke fragments as the input character. Based on this comparison, a Shape Feature Probability Matrix (SFPM) is created in which each possible shape feature corresponds to a row and to a column. Each entry in the SFPM represents a probability that, for any two characters having s strokes and having shape features $f_i$ and $f_j$ at position p (where $f_i$ is the feature code for the input stroke, $f_j$ is the feature code for the prototype stroke and p=1, 2, . . . s), the characters are the same. A Position Feature Probability Table (PFPT) is also generated. The PFPT is a one-dimensional array containing one entry for each possible feature distance, and which is indexed by feature distance. The feature distance D is calculated as $(x^j_{p1}-x^i_{p1})^2+(x^j_{p2}-x^i_{p2})^2+(y^j_{p1}-y^i_{p1})^2+(y^j_{p2}-y^i_{p2})^2$, where $(x^i_{p1},y^i_{p1})$ and $(x^i_{p2},y^i_{p2})$ are the start and end points for stroke p of the input ink. Each entry in the PFPT represents a probability that, for any two characters having s strokes and a feature distance D between strokes at the same position p, the characters are the same. During recognition, each input character is compared to each prototype by comparing the strokes of the input character and of the prototype; the first stroke of the input character is compared to the first stroke of the prototype, the second stroke of the input character is compared to the second stroke of the prototype, etc. Using the SFPM, a first number is computed by summing values obtained by indexing the first input and prototype strokes, by indexing the second input and prototype strokes, etc. Using the PFPT, a second number is computed by summing values indexed by the feature distances between the first input and first prototype stroke fragments, between the second input and second prototype stroke fragments, etc. A Match Probability value equals the sum of these first and second numbers. The prototype for which a comparison against the input character results in the highest probability of a match is considered the best match. As described in the '506 patent, the SFPM and PFPT values are based on a negative logarithmic function of the probability. Thus, the lowest Match Probability value corresponds to the highest probability of match.

Figure 14:
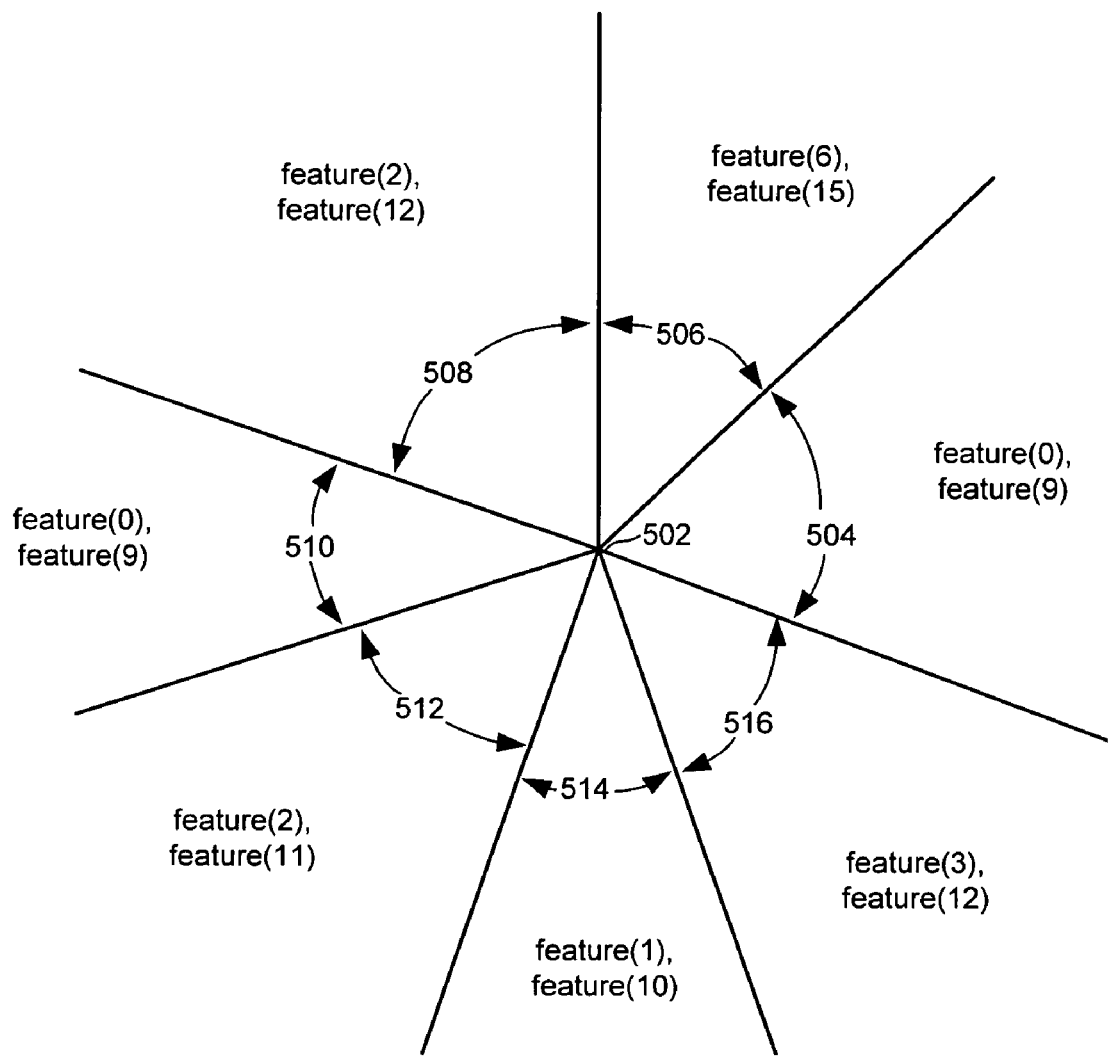
FIGS. 14-17 show feature types according to at least one embodiment of the invention.
Figure 15:
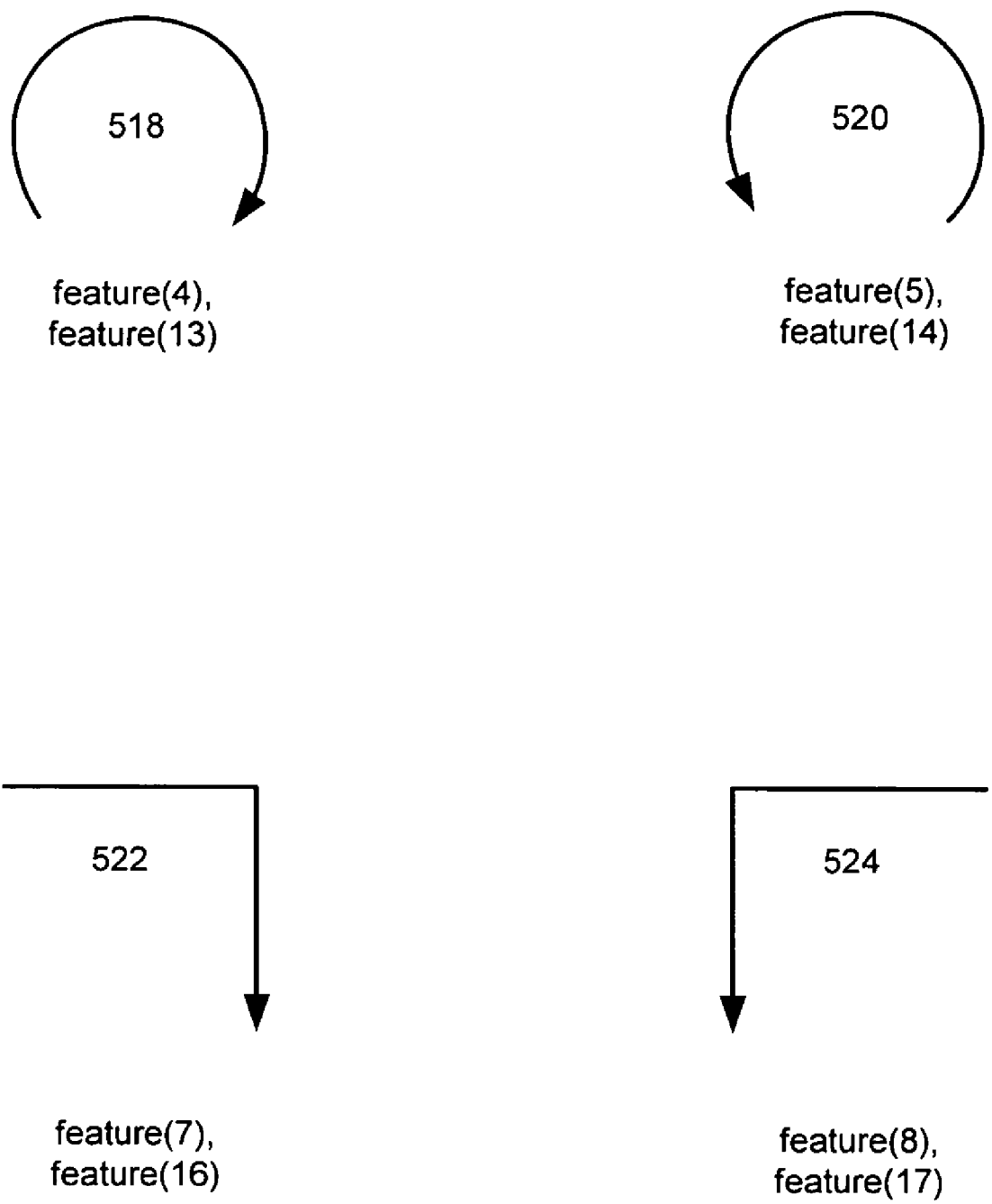

In some embodiments, there are eighteen possible shape codes for a stroke fragment. Stroke fragment shape codes depend on the shape and relative size of the stroke fragment. A stroke fragment is considered "small" if the width and height of the stroke fragment are respectively less than 6/16 of the width and height of the character; otherwise the stroke fragment is considered "large." Stroke fragments that are straight (or substantially straight) lines are classified as one of ten possible shape codes, depending on the direction and length of the line. Shown in FIG. 14 are seven ranges of possible directions. Small lines having a direction beginning at origin 502 and extending outward into one of the regions labeled 504 or 510 are assigned a shape code (also referred to as a feature code) 0, shown in FIG. 14 as feature(0). Large lines having the same direction are assigned a feature code 9, shown in FIG. 14 as feature(9). Other large and small straight lines have feature codes as shown in FIG. 14. FIG. 15 illustrates eight additional feature types. Small stroke fragments having a clockwise curve are assigned a feature code 4, shown in FIG. 15 as feature(4). Large stroke fragments having a clockwise curve are assigned a feature code 13, shown in FIG. 15 as feature(13). Other curved and angled stroke fragments have feature codes as shown in FIG. 15.

Figure 16:
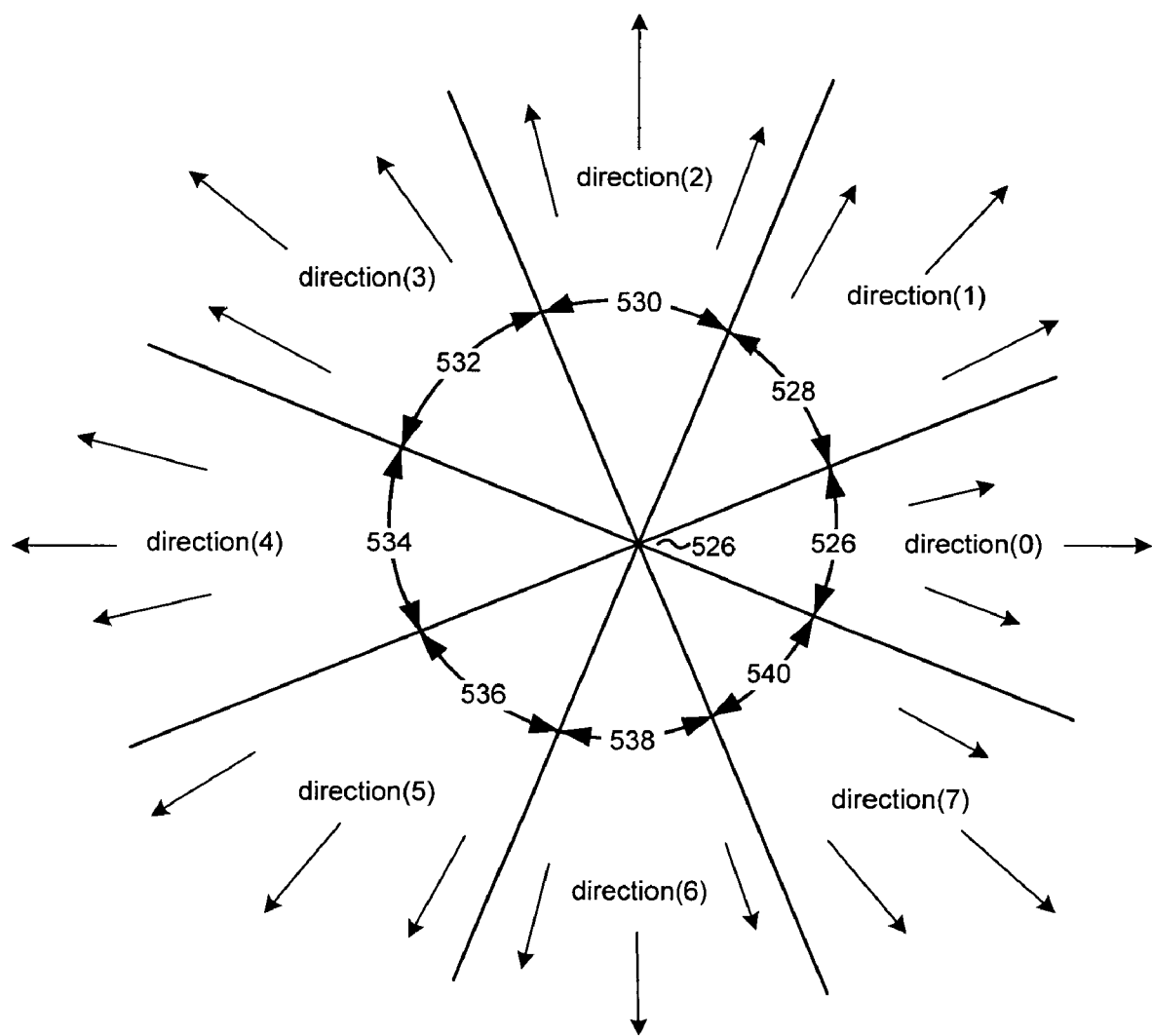

Stroke fragments are considered as curved based on a change in direction of the stroke fragment. Specifically, the direction of the stroke fragment is monitored from beginning to end of the stroke fragment. In this regard, the stroke fragment is analyzed from the viewpoint of an imaginary person walking along the stroke fragment as it is being drawn; a direction is assigned based on the angular sectors shown in FIG. 16. For example, a stroke fragment beginning at the origin 542 of FIG. 16 and extending into the region 526 would have direction(0). If the direction of the stroke fragment remains parallel to a vector beginning at origin 542 and terminating in region 526, the stroke fragment has not changed direction. If the stroke fragment at any time has a direction parallel to a vector beginning at origin 552 and ending in any of regions 528-540, the stroke fragment has changed direction.

Figure 17:
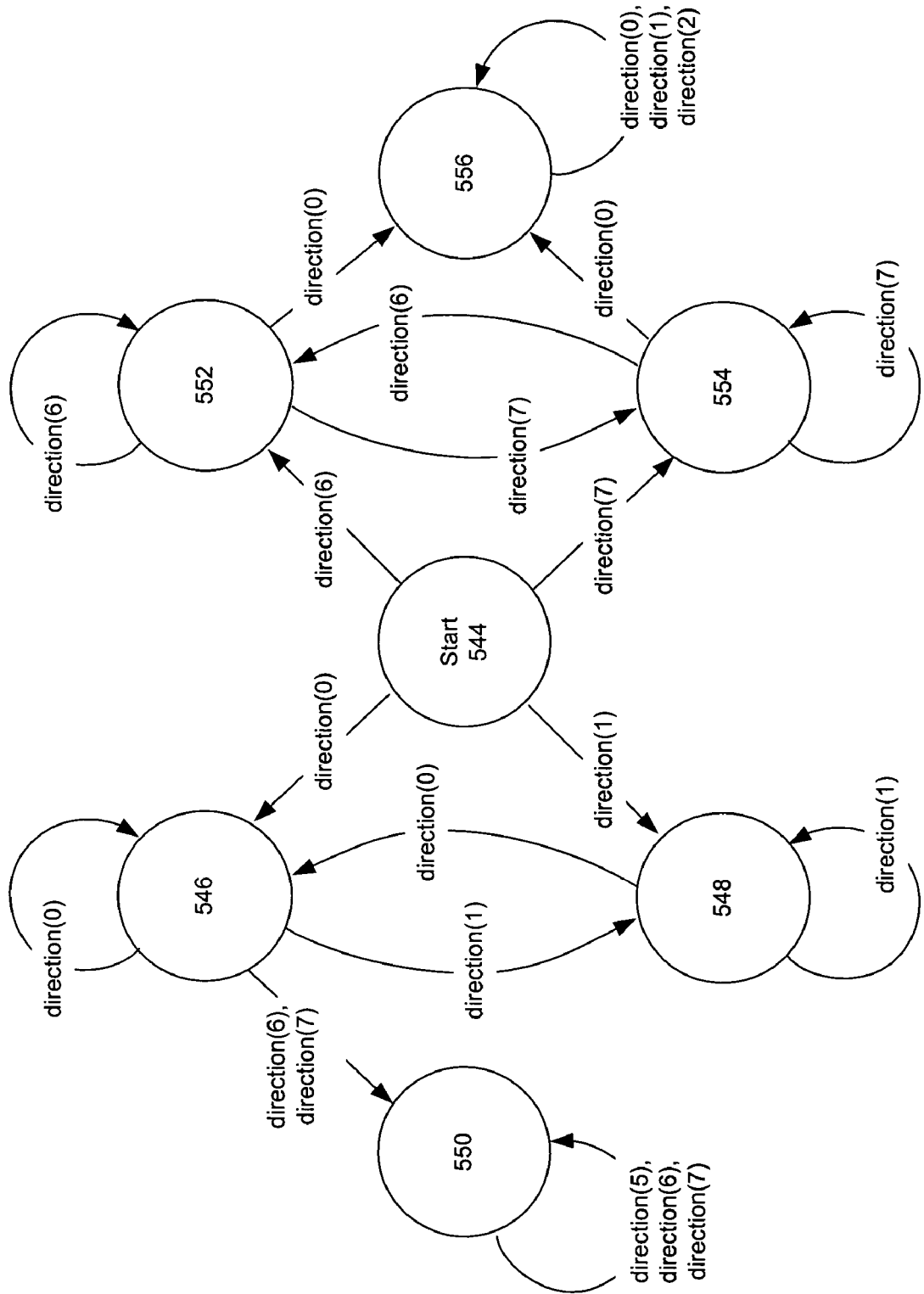

If a stroke fragment is determined to be curved, it is initially considered to have a feature corresponding to shape 518 or shape 520 (FIG. 15). The state machine of FIG. 17 is then used to determine whether the stroke fragment should instead be considered to have a feature corresponding to shape 522 or shape 524 (FIG. 15). The state machine begins at Start block 544 and transitions depending on the direction code for each step along the stroke fragment. If the stroke fragment has direction(0), the state machine transitions to block 546. If the stroke fragment then maintains direction (0), the state machine remains at block 546. If the stroke fragment changes to direction(1), the state machine transitions to block 548. If the stroke fragment changes back to direction(0), the state machine returns to block 546. If the stroke fragment changes to direction(6) or direction(7) while in block 546, the state machine transitions to block 550, where it remains so long as the stroke fragment has direction (5), direction(6) or direction(7). If the stroke fragment has direction(1) at its beginning (Start block 544), the state machine transitions to block 548. If the stroke fragment has direction(6) or direction(7) at its beginning (Start block 544), the state machine transitions to block 552 or block 554. The state machine transitions to block 556 from block 552 or block 554 if the stroke fragment has direction(0). If the state machine is in block 550 at the end of the stroke fragment, then a feature code corresponding to shape 520 (FIG. 15) is changed to a feature code corresponding to shape 524. If the state machine is in block 556 at the end of the stroke fragment, then a feature code corresponding to shape 518 is changed to a feature code corresponding to shape 522.

What has been described above is merely illustrative of the application of the principles of the invention. Those skilled in the art can implement other arrangements and methods without departing from the spirit and scope of the present invention. Any of the methods of the invention can be implemented in software that can be stored on computer disks or other computer-readable media.

We claim:

1. A method of segmenting at least one ink stroke into at least one plurality of segmented ink strokes, the method comprising:
   finding at least one pair of local extrema points on the at least one ink stroke;
   identifying a closest matching stroke-segmentation pattern by comparing at least first, second, and third stroke segments of the at least one ink stroke to a set of stroke-segmentation patterns, wherein the first, second, and third stroke segments are adjacent to the at least one pair of local extrema points; and
   segmenting the at least one ink stroke into the at least one plurality of segmented ink strokes based on a stroke-segmentation rule that corresponds to the identified closest matching stroke-segmentation pattern.

2. The method of claim 1, wherein finding the at least one pair of local extrema points comprises: traversing a plurality of points along the at least one ink stroke and detecting when the at least one ink stroke changes direction along an x-axis or a y-axis and moves more than a threshold distance in the changed direction.

3. The method of claim 1, wherein segmenting the at least one ink stroke further comprises at least one of: removing at least one of the first, second, and third stroke segments, and breaking the at least one ink stroke at or near at least one local extrema point of the pair of local extrema points.

4. The method of claim 1, further comprising segmenting the at least one plurality of segmented ink strokes based on a property of a curvature of the at least one plurality of segmented ink strokes, wherein the property is selected from the group consisting of: an inflection point between rotation of the at least one segmented ink stroke from a first direction to a second direction, and a cumulative curvature change of the at least one segmented ink stroke of greater than approximately 360 degrees.

5. The method of claim 1, wherein the at least one ink stroke is at least a part of an East Asian cursive character.

6. The method of claim 5, wherein the stroke-segmentation rule is based on common patterns in East Asian cursive writing.

7. The method of claim 6, further comprising: performing character-recognition processing on the plurality of segmented ink strokes.

8. The method of claim 7, wherein the character-recognition processing uses East Asian print prototype samples.

9. At least one computer-readable medium having computer-executable instructions for performing steps comprising:
   finding at least one pair of local extrema points on at least one ink stroke;
   identifying a stroke-segmentation rule to be applied to at least one segment of ink that is adjacent to a point of the at least one pair of local extrema points; and
   applying the identified stroke-segmentation rule to segment the at least one ink stroke into at least one plurality of ink strokes, wherein the stroke-segmentation rule causes to occur at least one of:
   removing an ink segment from between the at least one pair of local extrema points, and
   breaking the ink stroke at or near at least one local extrema point of the at least one pair of local extrema points.

10. The at least one computer-readable medium of claim 9, wherein finding the at least one pair of local extrema points comprises: traversing a plurality of points along the at least one ink stroke and detecting when the at least one ink stroke changes direction along an x-axis or a y-axis and moves more than a threshold distance in the changed direction.

11. The at least one computer-readable medium of claim 9 having further computer-executable instructions for performing the step of: identifying the stroke-segmentation rule by comparing at least first, second, and third stroke segments of the at least one ink stroke to a set of stroke-segmentation patterns, wherein the first, second, and third stroke segments are adjacent to the at least one pair of local extrema points and wherein the identified stroke-segmentation rule is associated with a closest matching stroke-segmentation pattern of the set of stroke-segmentation patterns.

12. The at least one computer-readable medium of claim 9, further comprising segmenting a stroke of the at least one plurality of segmented ink strokes based on a property of a curvature of the stroke of the at least one plurality of segmented ink strokes, wherein the property is selected from the group consisting of: an inflection point between rotation of the stroke of the at least one plurality of segmented ink strokes from a first direction to a second direction, and a cumulative curvature change of the stroke of the at least one plurality of segmented ink strokes of greater than approximately 360 degrees.

13. The at least one computer-readable medium of claim 9, wherein the at least one ink stroke is at least a part of an East Asian cursive character.

14. The at least one computer-readable medium of claim 13, wherein the stroke-segmentation rule is based on common patterns in East Asian cursive writing.

15. The at least one computer-readable medium of claim 14, further comprising: performing character-recognition processing on the plurality of segmented ink strokes.

16. The at least one computer-readable medium of claim 15, wherein the character-recognition processing uses East Asian print prototype samples.

17. A system for segmenting at least one ink stroke into at least one plurality of segmented ink strokes, the system comprising:
    an ink creation module that captures handwritten characters; and
    a stroke segmentation module that:
        finds at least one pair of local extrema points on the at least one ink stroke,
        identifies a stroke-segmentation rule to be applied to at least one segment of ink that is adjacent to a point of the at least one pair of local extrema points, and
        applies the identified stroke-segmentation rule to segment the at least one ink stroke into at least one plurality of ink strokes.

18. The system of claim 17, wherein finding the at least one pair of local extrema points comprises: traversing a plurality of points along the at least one ink stroke and detecting when the at least one ink stroke changes direction along an x-axis or a y-axis and moves more than a threshold distance in the changed direction.

19. The system of claim 17, wherein applying the identified stroke-segmentation rule causes to occur at least one of: removing an ink segment from between the at least one pair of local extrema points, and breaking the ink stroke at or near at least one local extrema point of the at least one pair of local extrema points.

20. The system of claim 17, wherein identifying the stroke-segmentation rule comprises: comparing at least first, second, and third stroke segments of the at least one ink stroke to a set of stroke-segmentation patterns, wherein the first, second, and third stroke segments are adjacent to the at least one pair of local extrema points and wherein the identified stroke-segmentation rule is associated with a closest matching stroke-segmentation pattern of the set of stroke-segmentation patterns.

21. The system of claim 17, further comprising segmenting a stroke of the at least one plurality of segmented ink strokes based on a property of a curvature of the stroke of the at least one plurality of segmented ink strokes, wherein the property is selected from the group consisting of: an inflection point between rotation of the stroke of the at least one plurality of segmented ink strokes from a first direction to a second direction, and a cumulative curvature change of the stroke of the at least one plurality of segmented ink strokes of greater than approximately 360 degrees.

22. The system of claim 17, wherein the at least one ink stroke is at least a part of an East Asian cursive character.

23. The system of claim 22, wherein the stroke-segmentation rule is based on knowledge of at least one pattern that is likely to appear in East Asian cursive writing.

24. The system of claim 23, further comprising: a character recognition module that performs character-recognition processing on the plurality of segmented ink strokes.

25. The system of claim 24, wherein the character-recognition processing uses East Asian print prototype samples.

* * * * *